Nov. 6, 1928.

M. W. SHELHOUSE 1,690,598

WORK DRIVER FOR CAR WHEEL LATHES

Filed May 15, 1926

INVENTOR
M. W. Shelhouse
BY
Joseph M. Schofield
ATTORNEY

Patented Nov. 6, 1928.

1,690,598

UNITED STATES PATENT OFFICE.

MAURICE W. SHELHOUSE, OF HAMILTON, OHIO, ASSIGNOR TO NILES-BEMENT-POND COMPANY, OF NEW YORK, N. Y., A CORPORATION OF NEW JERSEY.

WORK DRIVER FOR CAR-WHEEL LATHES.

Application filed May 15, 1926. Serial No. 109,393.

This invention relates to lathes and in particular to a work driver for a lathe adapted for operating upon mounted car wheels.

An object of the present invention is to provide an improved means for mounting work drivers upon the face plate of a lathe so that they will normally remain in adjusted position but which may be readily adjusted for car wheels or other work being operated on of different diameters.

Another object of the invention is to provide a resilient holding means for retaining a work driver in position upon the face plate comprising a T bolt and a nut thereon, a space between the nut and the work driver, preferably surrounding the T bolt, being provided for a suitable coiled spring so that the work driver is resiliently pressed against the face plate with an adjustable pressure.

Another object of the invention is to provide clamping means, preferably associated with the T bolt, so that at any time the work driver may be held permanently in fixed position by the operation of a clamping screw.

With these and other objects in view, my invention consists in the features of construction and operation set forth in the following specification and illustrated in the accompanying drawings.

In the accompanying drawing annexed hereto and forming a part of this specification, I have shown my invention embodied in a work driver for car wheel lathes, but it will be understood that the invention can be otherwise embodied and that the drawings are not to be construed as defining or limiting the scope of the invention, the claims appended to this specification being relied upon for that purpose.

In the drawing annexed hereto:

Figure 1:
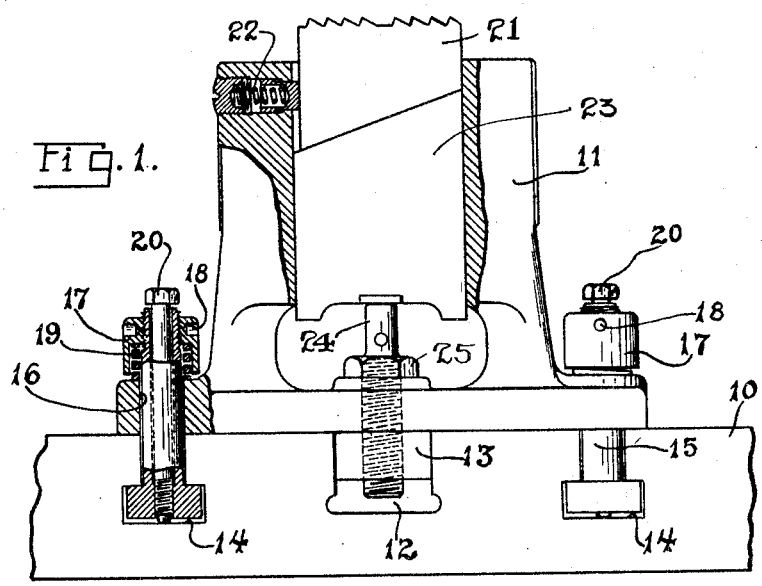
Figure 1 is a side view of a work driver attached to a lathe face plate.
Figure 2:
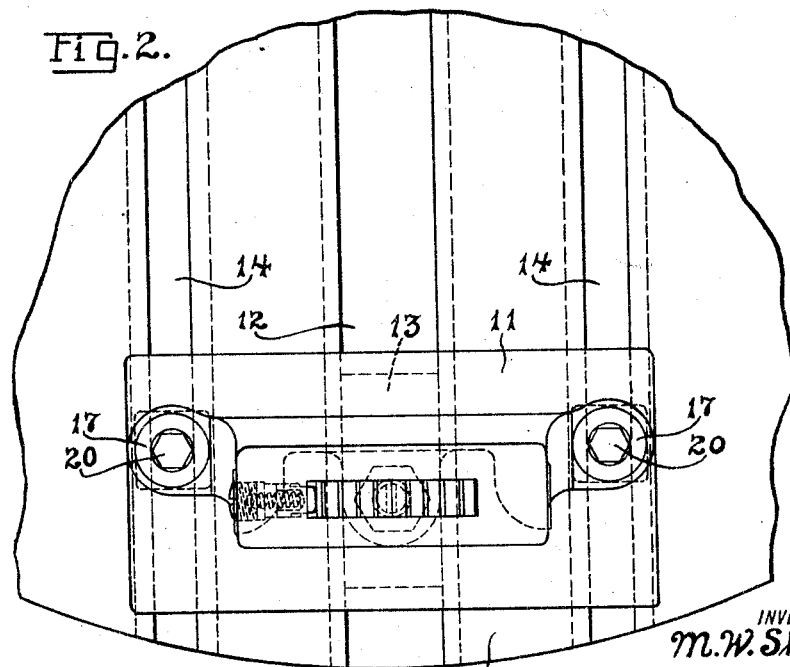
Fig. 2 is a plan view of the work driver shown in Fig. 1, also mounted on a lathe face plate.

In the above mentioned drawings, I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a bracket adapted to be mounted upon the face plate of a lathe; second, a work driver having a work engaging surface adjustably mounted thereon; third, T bolts adapted to enter slots within the face plate and passing through parts of the bracket; fourth, nuts mounted on the T slots; fifth, springs interposed between the nuts and the T bolts; and sixth, clamping screws preferably passing through the T bolts and engaging the lower surfaces of the slots in the face plate.

Referring more in detail to the figures of the drawing, I show a portion of a face plate 10 on which is mounted a work driver comprising a bracket 11. It will be understood that a plurality of these brackets 11 will be mounted in spaced positions about the face plate 10 so that they may engage and drive work mounted in the lathe on which the face plate is provided. In order that the work driver 11 may be adapted for different types of car wheels, which are of widely differing diameters, the bracket 11 is made adjustable across the face of the face plate 10. For this purpose radial slots 12 are provided, one for each of the brackets 11 and into which a projection 13 formed on the bracket 11 is adapted to extend. On either side of this slot 12 and extending parallelly therewith are T slots 14 into which are inserted T bolts 15. These T bolts 15 pass through suitable openings 16 at the base of the bracket 11 and at their outer ends are provided with nuts 17, preferably of the form shown and having wrench engaging openings 18 so that they may be readily adjusted. Between the nuts 17 and the bracket 11, disposed so that they will normally resiliently force the bracket 11 toward the face plate 10, are coiled springs 19 closely surrounding the T bolts 15. By this means it will be seen that the nuts 17 can be adjusted to compress the springs 19 sufficiently to normally retain the bracket 11 in any adjusted position but so that the bracket 11 may readily be manually adjusted radially without disturbing the adjustment of the T bolts 15 and nuts 17. Also it will be seen that as the driving force during operation is normal to the slots 12 in the face plate 10, no additional pressure will be brought upon the T bolts 15 and nuts 17 to vary their adjustment.

In order to clamp the bracket 11 in fixed position upon the face plate 10 if desired, a clamping screw 20 is provided for each of the T bolts 15, preferably extending directly through these T bolts 15 and adapted to engage the lower surface of the T slots 14 in the face plate 10. It will be seen, therefore, that by simply turning the clamping screw 20 to force its lower end against the lower surface of the T slot 14, the T bolt 15 will be forced against the upper portion of the slot 14 and thus securely clamp the T bolt 15 and bracket 11 in fixed position.

Within the bracket 11 is the work driver 21 having serrations on its outer end surface. This is spring pressed toward one side of the bracket by means of a spring 22. To support the driver 21 and permit adjustment of the driver 21 inward and outward of the bracket, a member 23 is slidably mounted within the bracket and has at its outer end a bevelled surface adapted to contact with the lower correspondingly bevelled surface of the work driver 21. To adjust the member 23 a screw 24 is provided entering a portion of the bracket 11 and bearing against the inner end of the member 23. Rotation of the screw 24 will therefore force the member 23 outward or permit it to move inward. To secure the screw 24 in any position of adjustment a check nut 25 is provided on the screw 24.

What I claim is:

1. A work driver for lathes comprising in combination, a face plate, a bracket adjustably mounted on said face plate, a work engaging jaw adjustable on said bracket, guiding means for said bracket permitting radial movement of said bracket on said face plate, retaining means therefor, movable with said bracket, and resilient means interposed in said retaining means permitting manual adjustment of said bracket along said guiding means when the retaining means are released.

2. A work driver for lathes comprising in combination, a face plate, a bracket adjustably mounted on said face plate, a work engaging jaw adjustable on said bracket, guiding means for said bracket permitting radial movement of said bracket on said face plate, T bolts entering said face plate and passing through said bracket, and resilient means on said T bolts permitting manual adjustment of said bracket along said guiding means when said T bolts are in unclamped position.

3. A work driver for lathes comprising in combination, a face plate, a bracket on said face plate, a work engaging jaw adjustable on said bracket, guiding means for said bracket on said face plate, bolts securing said bracket to said face plate, nuts adjustable on said bolts, and springs interposed between said nuts and said bracket, whereby said bracket may be readily and manually adjusted along said guiding means when said nuts are in unclamped position upon their bolts.

4. A work driver for lathes comprising in combination, a face plate, a bracket on said face plate, a work engaging jaw adjustable on said bracket, guiding means for said bracket on said face plate, bolts securing said bracket to said face plate, nuts adjustable on said bolts, springs interposed between said nuts and said bracket, whereby said bracket may be manually adjusted when said nuts are in unclamped position on said bolts, and screws adapted to secure said bracket fixedly to said face plate.

5. A work driver for lathes comprising in combination, a face plate, a bracket on said face plate, a work engaging jaw adjustable on said bracket, guiding means for said bracket on said face plate, bolts securing said bracket to said face plate, nuts adjustable on said bolts, springs interposed between said nuts and said bracket, and screws passing through said bolts and adapted to secure said bracket fixedly to said face plate.

6. A work driver for lathes comprising in combination, a face plate having T slots therein, a bracket on said face plate, a work engaging jaw adjustable on said bracket, guiding means for said bracket on said face plate, bolts extending within said T slots in said face plate and adapted to secure said bracket to said face plate, nuts adjustable on said bolts, springs interposed between said nuts and said bracket, and screws extending through said bolts and adapted to engage the lower surface of said T slots, whereby said bracket may be fixedly secured to said face plate.

7. A work driver for lathes comprising in combination, a face plate having radial slots therein, T slots in said face plate extending parallelly to said radial slots, a bracket on said face plate, a work engaging jaw adjustable on said bracket, a projection formed on said bracket adapted to engage one of said radial slots in said face plate and forming guiding means for said bracket on said face plate, bolts extending within said T slots in said face plate and adapted to secure said bracket to said face plate, nuts adjustable on said bolts, springs interposed between said nuts and said bracket, and screws extending through said bolts and adapted to engage the lower surface of said T slots, whereby said bracket may be fixedly secured to said face plate.

In testimony whereof, I hereto affix my signature.

MAURICE W. SHELHOUSE.